United States Patent
So et al.

(10) Patent No.: US 11,354,137 B2
(45) Date of Patent: Jun. 7, 2022

(54) MODULAR COMPUTING COMPONENT INFORMATION TRANSMISSION

(71) Applicant: Hewlett-Packard Development Company, L.P., Spring, TX (US)

(72) Inventors: Chi So, Spring, TX (US); Nam H. Nguyen, Spring, TX (US); Robert C. Brooks, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/048,120

(22) PCT Filed: Jul. 10, 2018

(86) PCT No.: PCT/US2018/041362
§ 371 (c)(1),
(2) Date: Oct. 16, 2020

(87) PCT Pub. No.: WO2020/013807
PCT Pub. Date: Jan. 16, 2020

(65) Prior Publication Data
US 2021/0173671 A1   Jun. 10, 2021

(51) Int. Cl.
*G06F 9/445* (2018.01)
*G06F 13/10* (2006.01)
*G06F 8/71* (2018.01)
*G06F 9/4401* (2018.01)

(52) U.S. Cl.
CPC ........ *G06F 9/44505* (2013.01); *G06F 13/102* (2013.01)

(58) Field of Classification Search
CPC ...... G06F 9/44505; G06F 13/102; G06F 8/71; G06F 9/4415

USPC ............... 710/10–11, 14–15, 33, 62, 105
See application file for complete search history.

(56) References Cited

U.S. PATENT DOCUMENTS

| | | | |
|---|---|---|---|
| 6,044,423 A * | 3/2000 | Seo | G06F 9/4411 710/302 |
| 7,751,333 B2 | 7/2010 | Campini et al. | |
| 7,860,582 B2 | 12/2010 | Ghercioiu et al. | |
| 8,463,951 B1 * | 6/2013 | Priem | G06F 13/102 710/10 |

(Continued)

FOREIGN PATENT DOCUMENTS

CN    107766066    3/2018

OTHER PUBLICATIONS

Aspire Desktop Computer User's Manual, ACER M1-601, Jul. 2015.

*Primary Examiner* — Idriss N Alrobaye
*Assistant Examiner* — Henry W Yu
(74) *Attorney, Agent, or Firm* — Fabian VanCott (57) ABSTRACT

In one example in accordance with the present disclosure, a modular computing component is described. The modular computing component includes a first terminal to connect the modular computing component to at least one of a host computing device and another modular computing component. Controller memory of the modular computing component stores information relating to at least one of build level information, revision level information, and generation level information. A controller of the modular computing component transmits the at least one of build level information, revision level information, and generation level information to the host computing device.

20 Claims, 5 Drawing Sheets

(56) References Cited

U.S. PATENT DOCUMENTS

| | | | |
|---|---|---|---|
| 2006/0026280 A1* | 2/2006 | Sadovsky | H04L 69/18 709/224 |
| 2006/0050693 A1* | 3/2006 | Bury | H04L 49/901 370/389 |
| 2008/0100946 A1* | 5/2008 | Greco | G11B 27/322 360/55 |
| 2008/0243901 A1* | 10/2008 | Super | G06F 8/35 |
| 2009/0024757 A1* | 1/2009 | Proctor | H04L 69/18 709/232 |
| 2012/0079075 A1 | 3/2012 | Glenn | |
| 2012/0173732 A1 | 7/2012 | Sullivan | |
| 2013/0268744 A1 | 10/2013 | Chan et al. | |
| 2017/0324576 A1* | 11/2017 | Jain | G06F 9/50 |

\* cited by examiner

Fig. 5

MODULAR COMPUTING COMPONENT INFORMATION TRANSMISSION

BACKGROUND

Computing devices undoubtedly play a role in many people's day-to-day lives. Computing devices include processors, memory, and other hardware components to carry out a wide variety of functions. For example, computing devices are heavily used tools in business and home settings.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

As described above, computing devices are commonplace in today's society. Millions of individuals find themselves sitting, or standing, in front of a computing device on a weekly, if not daily, basis. With the continued development of these devices, their use in society is sure to increase. That is, in today's increasingly technological world, computing device use will inevitably become more ubiquitous. Accordingly, computing devices that more fully address user demands/wants may further enhance their utility to society.

Accordingly, the present specification describes a computing system with modular components. That is, a host computing device provides a central processor and memory for carrying out functions. This host computing device may have a stand-alone housing. Additional modular components, which are also units with their own housings, can then be coupled to the host computing device as desired. That is the modular components reflect additions to a computing system that may be unique to a particular application. One such modular component is an optical disk drive. Other examples of modules that can be coupled to the host computing device include a wireless display component and a video conferencing component that includes hardware to facilitate video conferencing calls.

The present specification also describes the transmission of data to aide in the development and use of such modular components. That is, the computing system platform may have different generational levels, the modular component itself may have a revision level, and the modular component may be at a different developmental stage. The host computing device can query each modular component for such information and take actions based thereon. Without such information being transmitted electronically, a user, manufacturer, or other administrator may have to remove the housing to the modular computing component, and evaluate internal markings or characteristics to determine the revision, generation, and build level information. Doing so is cumbersome and difficult.

Accordingly, the present specification describes a system wherein such information is queried by the host computing device to which the modular computing component is coupled. Accordingly, the host computing device can, without user input, ascertain the build, generation, and revision level of the modular computing component. Being able to acquire this information without user input allows the host computing device to more quickly take actions based on the information and thus allows the actions taken to be executed more quickly and efficiently. Still further, acquiring this info without user input, avoids user error such as transcription errors or otherwise ignoring of the information.

Specifically, the present specification describes a modular computing component. The modular computing component includes a first terminal to connect the modular computing component to at least one of a host computing device and another modular computing component. Controller memory of the modular computing component stores information relating to at least one of build level information, revision level information, and generation level information. A controller of the modular computing component transmits the at least one of build level information, revision level information, and generation level information to the host computing device.

The present specification also describes a method. According to the method, a modular computing component is queried for build level information, revision level information, and generation level information. Responsive to the querying, the build level information, revision level information, and generation level information is received for the modular computing component. An action is then taken, at a host computing device, based on the build level information, revision level information, and generation level information for the modular computing component.

The present specification also describes a computing system that includes a host computing device. The host computing device includes a processor and memory communicatively coupled to the processor, the memory having instructions embodied therewith, the instructions executable by a processor to cause the processor to carry out a computing operation. The computing system also includes a modular computing component. The modular computing component includes a housing, a first terminal to connect the modular computing component to at least one of the host computing device and another modular computing component, and a second terminal to serially couple the modular computing component to another modular computing component. Controller memory of the modular computing component stores information relating to at least one of build level information, revision level information, and generation level information. A controller transmits to the host computing device 1) build level information which indicates a production stage of the modular computing component, 2)

revision level information which indicates a sub-division within a build level for the modular computing component, and 3) generation level information which indicates a feature set associated with the modular computing component. The modular computing component also includes an alignment component disposed on at least one of a top surface and a bottom surface of the housing to receive and align the modular computing component with at least one of the host computing device and another modular computing component. In this example, the modular computing component is external to the host computing device.

In summary, using such a computing system 1) provides development information to component developers; 2) streamlines debugging and other development operations; 3) avoids user intervention and error in acquiring the development information; and 4) automates development information transmission. However, the devices disclosed herein may address other matters and deficiencies in a number of technical areas.

Figure 1:
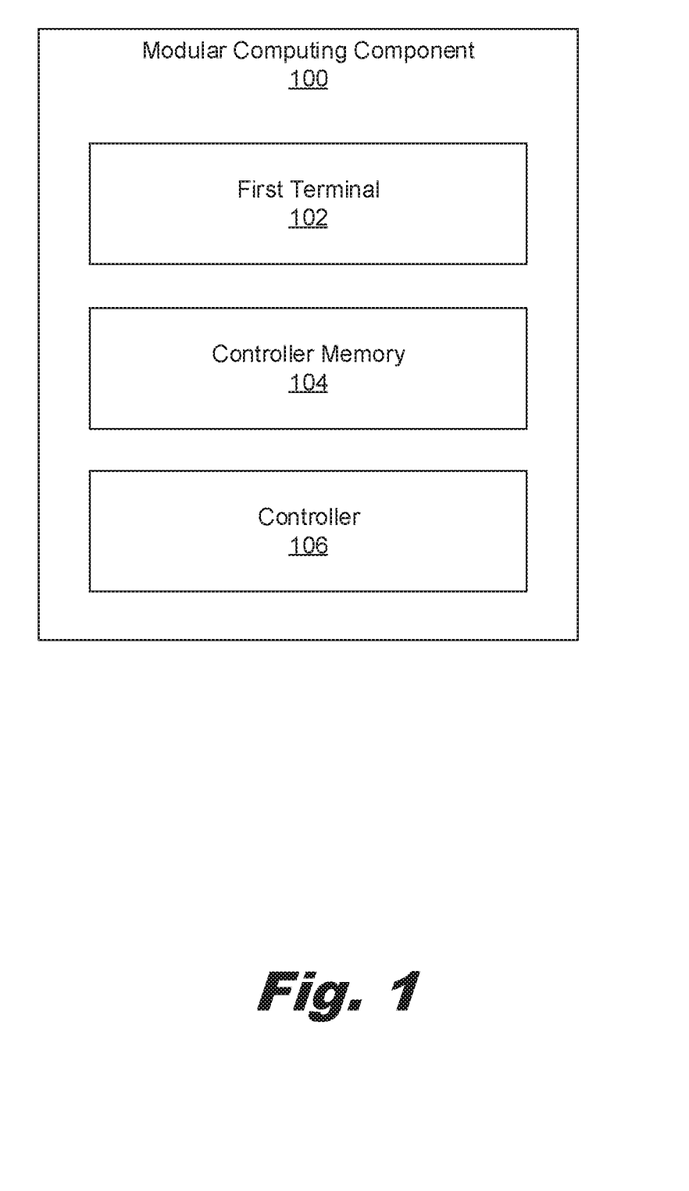
FIG. 1 is a block diagram of a modular computing component for transferring component information, according to an example of the principles described herein.

Turning now to the figures, FIG. 1 is a block diagram of a modular computing component (100) for transferring component information, according to an example of the principles described herein. As described above, the modular computing component (100) is a standalone component that can be added to a computing system to carry out a particular computing operation. For example, the modular computing component (100) may be an optical disk drive, or other hard disk drive, that provides storage for the computing device. In another example, the modular computing component (100) may be an audio component that includes a speaker. In yet another example, the modular computing component (100) may be a video ingest component. In yet another example, the modular computing component (100) may be a conference call component that includes specific hardware components to facilitate video/audio conference calls.

Multiple modular computing components (100) can be added together to form a customized computing system. In some examples, the various modular computing components (100) can be added together, specifically, they can be physically stacked one on top of the other. Given the wide variety of computing functions that can be executed by the modular computing components (100), a computing system that implements the present modular computing component (100) allows for a customized and tailored computing system for a particular circumstance. Doing so may allow for a more efficient computing system as those functions that may not be used by a particular user may be eliminated from a system and just those components to carry out a particular function are implemented in the system.

As such a system is modular, the modular computing component (100) includes at least a first terminal (102) to connect the modular computing component (100) to another modular computing component (100) or to the host computing device. For example, an audio modular computing component (100) may be stacked below, and electrically coupled to, the host computing device that includes a central processing unit (CPU), memory, and motherboard among other components.

The first terminal (102) may be a universal serial bus (USB) connection. Specifically, the first terminal (102) may be a USB-type C terminal that allows for the transmission of various pieces of data. For example, the first terminal (102) allows transmission of 1) that data used for the execution of the functionality of that particular modular computing component (100) and 2) data used in the control and management of that modular computing component (100).

The modular computing component (100) also includes controller memory (104). In addition to storing information relating to the function of the modular computing component (100), the controller memory (104) stores information that identifies the modular computing component (100). Specifically, the modular computing component (100) includes at least one of build level information, revision level information, and generation level information.

Build level information indicates a production stage of the modular computing component (100). That is, as a modular computing component (100) is being developed, it goes through different sequential stages of development, with the modular computing component (100) becoming more refined and finalized with each development stage. Specifically, during a first stage, basic functionality of the modular computing component (100) may be established and the modular computing component (100) may be implemented with a soft-tooled chassis. In a second stage, debugging and other operations are carried out and the modular computing component (100) may be more widely distributed to different operators. In the second stage, the modular computing component (100) may be implemented with a hard-tooled chassis. During a third stage, the modular computing component (100) may be partially released to the public for testing and may include a final, or near-final chassis. While particular reference is made to different developmental stages, different build level stages may be implemented wherein each stage can be identified and stored in controller memory (104).

Identifying the build level of a modular computing component (100) facilitates its more effective development. For examples, issues in a modular computing component (100) at one build level may be remedied in the next build level. However, if a developer is unsure of which build level the modular computing component (100) is at, then the developer may work to address that issue, not knowing that the issue has already been fixed. For example, in a second build stage, it may be determined that a particular modular computing component (100) has an issue, such as improper output of audio. This may be remedied by the third build stage. However, a developer who is working with the second build stage modular computing component (100) may assume that the issue has re-surfaced, when in fact he is just working with an outdated modular computing component (100) as identified by the build level information.

Build level information included on a sticker internal to the modular computing component (100) or on the bottom of the modular computing component (100) poses certain complications. For example, such stickers may become damaged or may even be removed. Also, in these cases, implementing a course of action based on the identified build level was reliant on the user properly observing, considering, and adhering to the identification on the sticker. By comparison, including the build level information on the controller memory (104) ensures that the information is not lost to mechanical damage and may control the use of the modular computing component (104). For example, the build level information could prevent certain actions being executed based on the identified build level.

Still further, including the build level information, and other level information on controller memory (104) allows for the obtaining of this information without having to manually acquire the information. That is, manually acquiring the information may include powering down the system, removing modular computing components (100), and disassembling the modular computing component (100) to get the information. Such operations are time-consuming, prone to human error, and can lead to undesirable results.

Revision level information refers to a division within a build level that further defines the characteristics of a modular computing component (100). For example, different modular computing components (100) even within a build level may be at different stages. For example, even modular computing components (100) within a particular build level may have a different set of characteristics, with each revision being closer to advancing the modular computing component (100) towards its next build level. That is, a revision level of a modular computing component (100) defines a modular computing component (100) stage within a particular build level. As with the build level information, including the revision level information on a controller memory (104) increases information collection and avoids certain collection errors that may otherwise exist.

In yet another example, the controller memory (104) includes generation level information which describes a feature set of the modular computing component (100). That is different releases of a product may have different feature sets such as an increased quantity of speakers, increased functionality, or a different appearance. In other words, different generations of modular computing components (100) may have different technical capability provided by a different feature set. As another example, the different generation levels may indicate different protocols. For example, in a first generation, certain computing system protocols may be in place. Such generation level information may indicate compatibility between modular computing products (100). For example, it may be the case that modular computing components (100) at a first generation level are not compatible with modular computing components (100) or a host computing device at a third generation level.

If the modular computing components (100) are physically similar, a user or developer may not know what generation they are working on and as such may attribute a development or technical issue to a particular modular computing component (100) when really the issue is compatibility-related and that the modular computing component (100) is operating as intended. Thus, including such generation level information on the controller memory (104) as opposed to some visual location within the modular computing component (100) facilitates the ease with which the information can be collected and implemented.

The modular computing component (100) also includes a controller (106). The controller (106) among other things, transmits the build level information, revision level information, and generation level information to a host computing device. That is, the host computing device can query the modular computing component (100) for this information and such information can be received. The controller (106) can then take any number of actions based on the information. For example, the controller (106) may generate a message to a user indicating the information. In some examples, the controller (106) may provide additional information for example, a development history, or a revision history for the modular computing component (100).

As described above, the controller (106) passes information to a host computing device, which host computing device may have a same form factor as the modular computing components (100) and may include certain components such as a central processing unit (CPU), random access memory (RAM), read only memory (ROM), and other hardware components. The controller (106) may be a power delivery controller that performs other operations in addition to the passing of the build level, revision level, and generation level information. For example, the controller (106) may be a controller (106) to interface with the first terminal (102), which first terminal (102) may be a USB type-c terminal.

In some examples, the controller (106) straps the build level information, revision level information, and generation level information through the first terminal (102). That is, the first terminal (102) may have a high speed differential signal that when put in different modes can be used for different things. For example, data transmitted therein may be used for video signals, high-definition multimedia interface (HDMI) signals etc. This transmission path may also include a configuration channel communication link through which various control signals pass. Specifically, via this configuration channel, configuration pins on the first terminal (102) are used during negotiation to transfer configuration information. These pins, and this configuration channel, can be used to transfer build, generation, and revision level information when the first terminal (102) is set to an alternative mode, which is defined as a communications protocol specific to this information.

In one example, the controller (106) may be set to an alternative mode wherein signals indicating the build level, revision level, and generation level can be passed. That is, when in the alternative mode, the build level, revision level, and generation level information can be passed via the configuration channel communication link. At other times, i.e., other predetermined modes, the configuration channel communication link is used to pass other types of control information using different communication protocols. That is, the first terminal (102) may be able to transmit different control information using different communication protocols. The present system may use a protocol specific to transmitting build level information, revision level information, and generation level information.

In some examples, the values may be set by a strapping resistor in the modular computing component (100). In this example, the build level, revision level, and/or generation level is set and defined by the strapping resistor. That is, a build level and a generation level for a particular physical modular computing component (100) may never change, that is, once a design build level modular computing component (100) always a design build level modular component.

By comparison, the revision level, and in some cases the build level and generation level, may change. Accordingly, the controller memory (104) that stores this information may be re-writeable.

In other examples, the level information can be captured in register fields. For example, a 3 bit field in a configuration register in the controller memory (104) could be designated for the device generation. In this example, the build level, revision level, and generation level information is a digital value. That is, an Analog-to-Digital (ADC) converter could translate an analog voltage into one of 8 different levels that would be reported in the 3 bit field. The analog voltage could be set in the design with a voltage divider using specific resistor values in the voltage divider. Similarly 3-bit fields could be used to designate particular build levels and revision levels. Note that while particular reference is made to particular ways to indicate the build level, revision level, and generation level, other methods may be implemented as well. For example, the information be stored entirely as digital values. For example, the values may be saved on a device with pull-up and pull-down resistors.

In some examples, the controller (100) alters the interaction of the host computing device with the modular computing component (100). For example, the controller (100) may enforce certain build level, revision level, and/or generation level operations. That is, certain operations may not be permitted in a first stage and so the controller (100), after transmitting that the modular computing component (100) is within the first stage build level, may block those operations.

Figure 2:
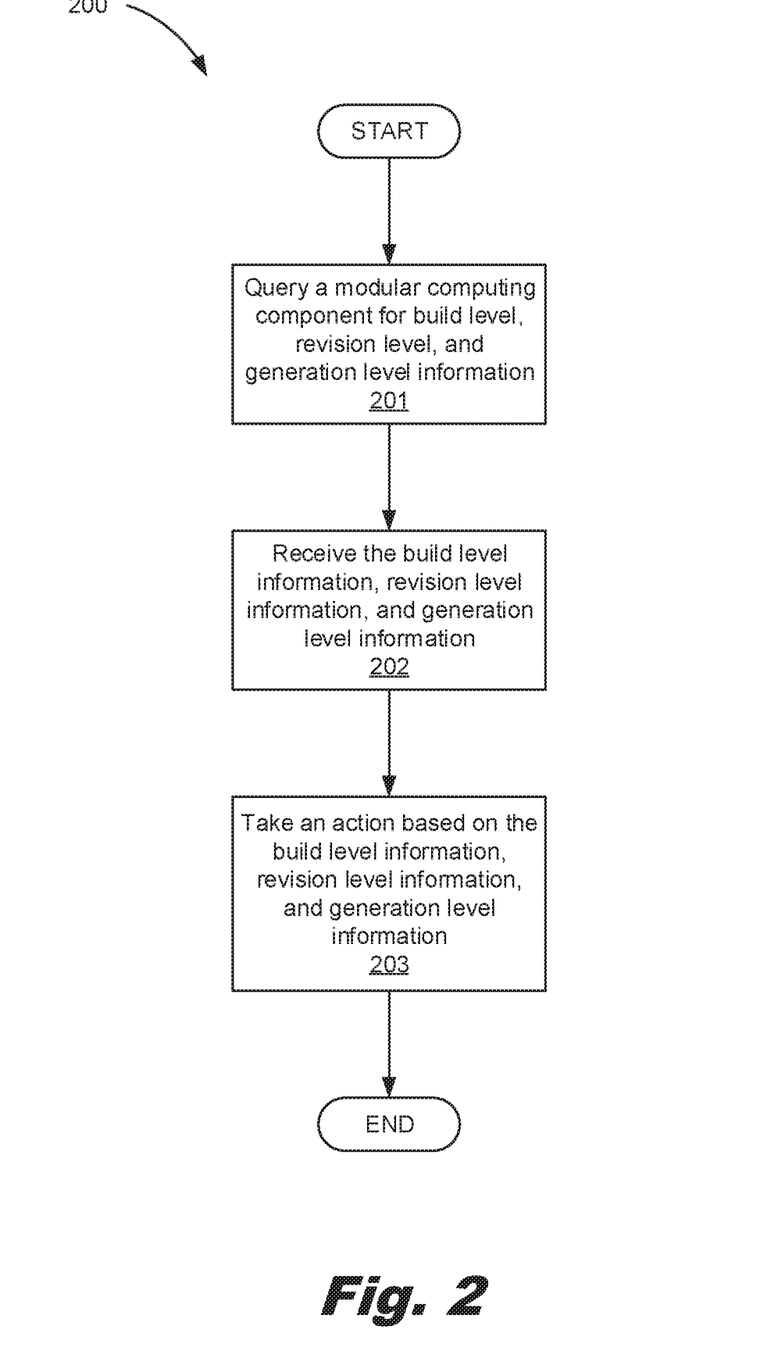
FIG. 2 is a flow chart of a method for transmitting modular computing component information, according to an example of the principles described herein.

FIG. 2 is a flow chart of a method (200) for transmitting modular computing component (FIG. 1, 100) information, according to an example of the principles described herein. According to the method, a modular computing component (FIG. 1, 100) is queried (block 201) for build level information, revision level information, and generation level information. Such a query (block 201) may occur during a boot, or startup, operation. That is, while the power is turned off, a modular computing component (FIG. 1, 100) may be coupled to a host computing device, which host computing device may have the same form factor as the modular computing component (FIG. 1, 100). As described above, the host computing device includes basic computing components such as a CPU, system memory, cache, RAM, ROM, power connections, and network connections, such as a wired network port and/or a wireless network connection.

When the modular computing component (FIG. 1, 10) is coupled to the host computing device mechanically via an alignment mechanism and via an electrical connection such as through the first terminal (FIG. 1, 102), the host computing device may be turned on and booted. During this boot operation, the host computing device may send a query (block 201) via the first terminal (FIG. 1, 102). Specifically, during a portion of startup, the host computing device and modular computing component (FIG. 1, 100) may use an alternative mode which is a protocol wherein data signals passed over a communication channel are indicative of the build level, revision level, and generation level. That is, the first terminal (FIG. 1, 102) may be used to pass signals related to functionality, i.e., video signals, HDMI signals etc., and can also pass control signals via the configuration channel communication link. Accordingly, during setup a specific period of time can be set aside for the transmission of build level, revision level, and generation level data.

Responsive to the query, the host computing device receives (block 202) the build level information, revision level information, and/or generation level information from the modular computing component (FIG. 1, 100). Such information may be represented as digital values. In this example, the controller (FIG. 1, 106) includes an analog-to-digital converter that converts a received analog voltage as established by a strapping resistor. The controller (FIG. 1, 106) then maps this analog voltage value to a digital value in a register, which digital value is passed to the host computing device.

In some examples, the information may be transferred via a multi-voltage pin and the information may be transferred via a single component of the modular computing component.

With the information collected, the host computing device can take (block 203) an action based on the build level information, revision level information, and generation level information. Any number of actions may be taken. For example, the host computing device may provide the information to a user via a message. Such a message may be a basic input/output system (BIOS) post message. In another example, the message may be delivered at a later stage of initialization, such as when an operating system comes on line. Such an action ensures that a developer or user is aware of the build level, revision level, and generation level for a particular modular computing component (FIG. 1, 100). The user may then act accordingly based on the collected information.

As described above, storing this information and presenting it to the user via a user interface enhances development and operational efficiency. That is, rather than waiting for a user to identify the information, the build level, revision level, and generation level information can be collected in milliseconds and is less prone to user error in identification of the build level, revision level, and/or generation level for the modular computing component (FIG. 1, 100).

In another example, the action may include updating the modular computing component (FIG. 1, 100). For example, as described above, throughout the course of its development and operational live, the hardware components of a modular computing component (FIG. 1, 100) may be updated. Such updates may, for example, resolve bugs in the modular computing component (FIG. 1, 100), or may simply provide additional functionality. A user and/or a developer may desire to implement the latest revision of a particular component. Accordingly, upon receiving (block 202) the data, the host computing device with or without express authorization from the user, may perform an update to bring the modular computing component (FIG. 1, 100) up to the latest revision.

In another example, taking (block 203) an action may include disabling a subset of the functionalities of the modular computing component (FIG. 1, 100). For example, it may be the case that during different build levels, a developer wants to disable certain functionalities of the modular computing component (FIG. 1, 100) for example to test and evaluate a single functionality of the modular computing component (FIG. 1, 100). In another example, it may be undesirable for certain components to be active during certain stages. For example, it may be undesirable that a call initialization feature be activated on a wireless calling modular computing component (FIG. 1, 100) until a wireless radio can be configured. Accordingly, in these examples and others it may be desirable to limit certain functionalities of the modular computing component (FIG. 1, 100) based on build level, revision level, and/or generation level. Accordingly, such an action may be to disable a subset of the functionalities.

In other examples, the action may include deactivating the modular computing component (FIG. 1, 100) altogether. That is, a manufacturer may just enable modular computing components (FIG. 1, 100) in the system integration stage and disable all those that are in the product verification to ensure against undesired or unwanted distribution of the modular computing component (FIG. 1, 100) until a particular point in time when certain functionalities are fully ready.

While particular reference is made to a few specific actions that can be taken (block 203), any number of actions can be taken. Thus, the present method (200) describes how a modular computing component (FIG. 1, 100) can be queried for information that otherwise would be manually collected by a user. Using this information, a variety of actions can be taken to increase the efficiency of the development of a modular computing component (FIG. 1, 100) and/or the general use of a computing system in which the modular computing component (FIG. 1, 100) is a part.

Figure 3:
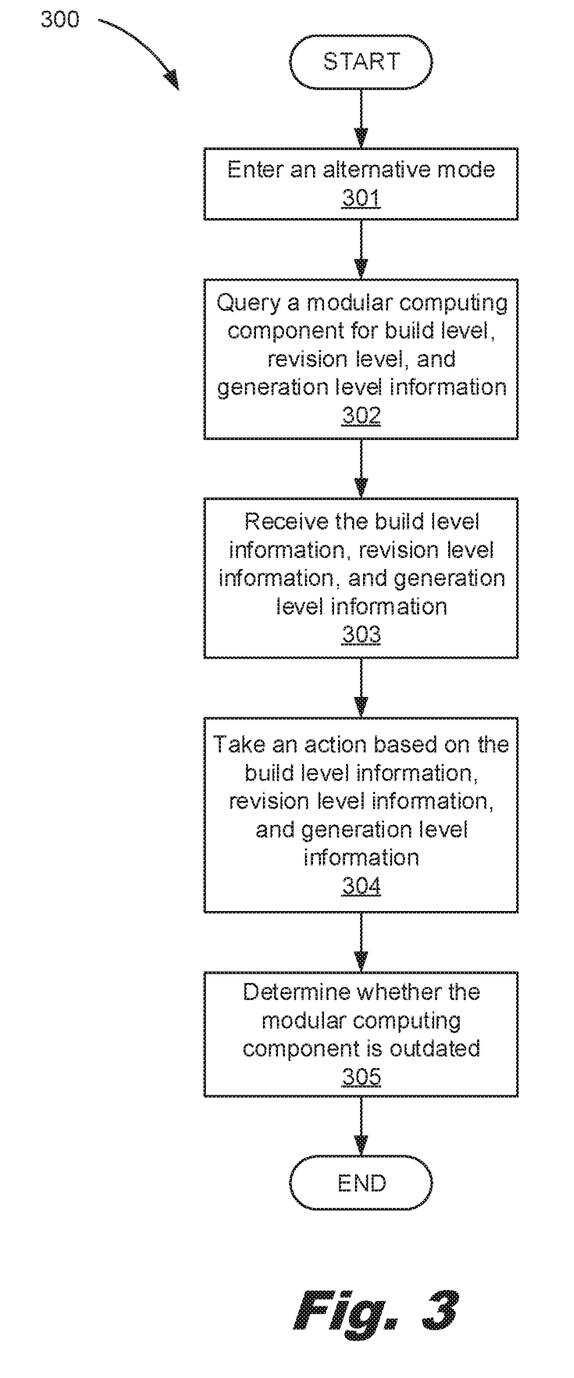
FIG. 3 is a flow chart of a method for transmitting modular computing component information, according to an example of the principles described herein.

FIG. 3 is a flow chart of a method (300) for transmitting modular computing component (FIG. 1, 100) information, according to an example of the principles described herein. According to the method (300) a computing system enters (block 301) an alternative mode wherein build level information, revision level information, and generation level information is transmitted using a multi-use control data channel. That is, the modular computing components (FIG. 1, 100) and the host computing device may be coupled to one another via terminals that establish a communication link. One channel of the communication link is a configuration channel wherein negotiations are carried out during system boot. In one example, to acquire the build level, revision level, and generation level information, the system may enter (block 301) an alternative mode, which may be defined as a mod wherein a particular protocol is used to transmit the build level, revision level, and generation level information.

During this alternative mode, the controller (FIG. 1, 106) and the host computing device are set to receive and interpret the build level, revision level, and generation level data. That is during the alternative mode, a particular mapping may be relied on that maps received and transmitted values to particular build levels, revision levels, and generation levels. For example, during the alternative mode, particular signals may be sent along the configuration channel communication link. In the alternative mode, the unique signals sent during this period of time are mapped to build levels, revision levels, and generation levels. Accordingly, in the alternative mode a particular protocol unique to the build level, revision level, and generation level information is put in place. Outside of the alternative mode, different mappings, protocols, and signals are passed along the configuration channel communication link.

Once in the alternative mode, the host computing device queries (block 302), and receives (block 303) from, the modular computing component (FIG. 1, 100) the build level information, revision level information, and the generation level information. With such information on hand, an action such as providing notification to a user and/or disabling some or all of the functionality of the modular computing component (FIG. 1, 100) is taken (block 304). In some examples, this may be performed as described above in connection with FIG. 2.

In one particular example, the method (300) may include determining (block 305), whether the modular computing component (FIG. 1, 100) is outdated based on the build level, revision level, and generation level information.

In this example, the host computing device can compare the information to a database which indicates what the latest state for that modular computing component (FIG. 1, 100) is. That is, the host computing device may be in communication with a database, which may be remotely stored. That database may indicate for at least the modular computing component (FIG. 1, 100) the latest information from which it may be determined (block 305) that the modular computing component (FIG. 1, 100) is outdated. If this is the case, the host computing device may update the modular computing component (FIG. 1, 100), automatically or via user authorization, with the latest configuration information for that modular computing component (FIG. 1, 100).

Figure 4:
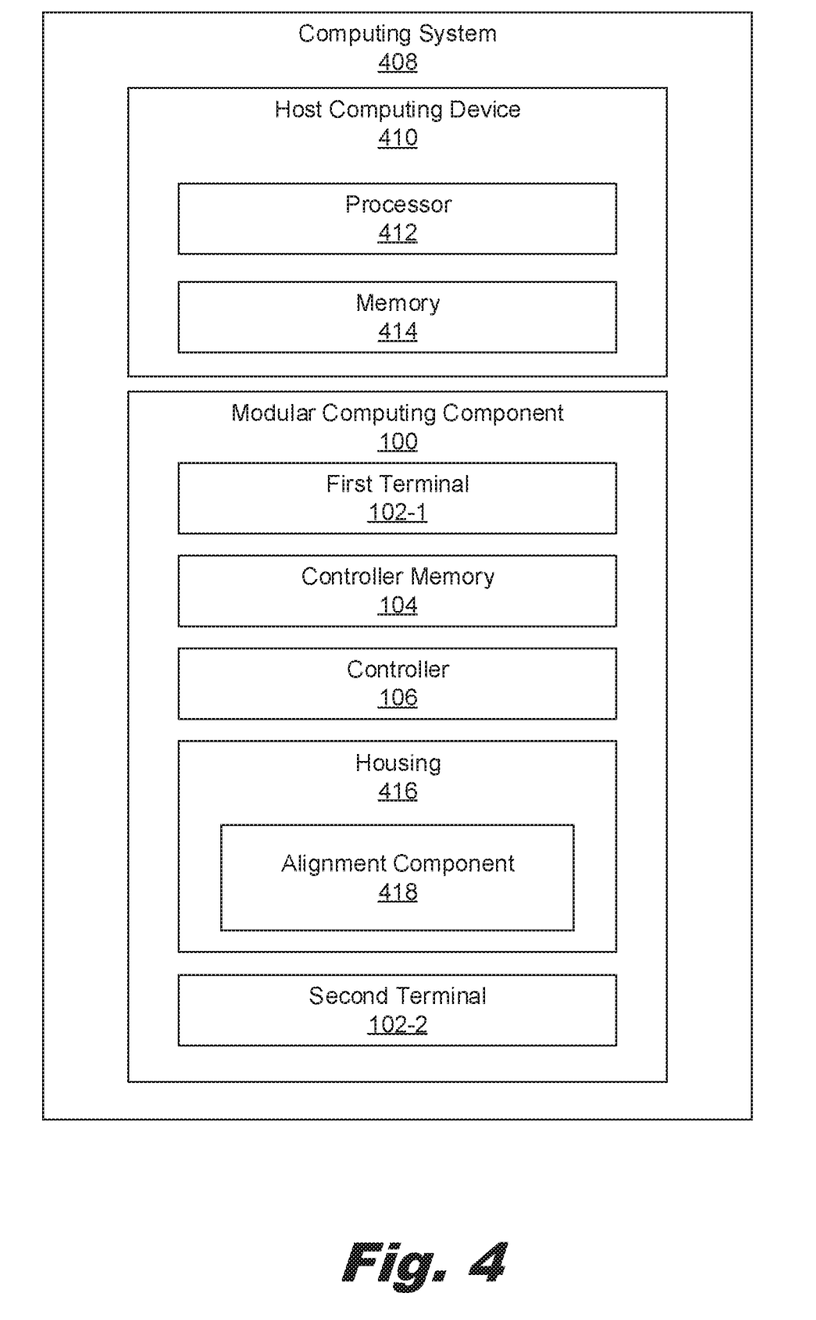
FIG. 4 is a block diagram of a computing system with modular components, according to an example of the principles described herein.

FIG. 4 is a block diagram of a computing system (408) with modular computing components (100), according to an example of the principles described herein. As described above, the computing system (408) may be a modular system wherein multiple modular computing components (100) can be coupled to a host computing device (410) to carry out various specific computing functions.

The computing system (408) includes a host computing device (410). In this example, the host computing device (410) includes a processor (412) and memory (414) communicatively coupled to the processor (412). The memory (414) includes instructions embodied therewith that are executable by the processor (412) to cause the processor (412) to carry out computing operations.

The processor (412) may include the hardware architecture to retrieve executable code from the memory (414) and execute the executable code.

The memory (414) may store data such as executable program code that is executed by the processor (412) or other processing device. The memory (414) may include various types of memory modules, including volatile and nonvolatile memory. For example, the memory (414) of the present example may include Random Access Memory (RAM), Read Only Memory (ROM), and cache. Many other types of memory may also be utilized, and the present specification contemplates the use of many varying type(s) of memory in the memory (414) as may suit a particular application of the principles described herein.

The host computing device (410) may include hardware adapters to enable the processor (412) to interface with various other hardware elements, external and internal to the host computing device (410). For example, peripheral device adapters may provide an interface to input/output devices, such as, for example, a display device, a mouse, or a keyboard. The peripheral device adapters may also provide access to other external devices such as an external storage device, a number of network devices such as, for example, servers, switches, and routers, client devices, other types of computing devices, and combinations thereof.

In some examples, the host computing device (410) may have the same form factor as the modular computing components (100). That is, within the computing system (408), modular computing components (100) may be stacked one on top of the other. Accordingly, in some examples, the host computing device (410) has the same form factor. That is, the host computing device (410) and the different modular computing components (100) may have a same width and length, and in some examples a same height. Having the same form factor, the components may be stacked on one another. For example, one modular computing component (100) may be stacked on another computing components (100). Still further, as the host computing device (410) has a same shape or form factor as the modular computing components (410), it may be stacked thereon as well. Note that in some examples, modular computing components (100) are not stacked on top of the host computing device (410). That is, the host computing device (410) may be the top of the stack of modular computing components (100).

The computing system (408) also includes at least one modular computing component (100). In some examples, the computing system (408) includes multiple modular computing components (100). As described above, each modular computing component (100) includes a fist terminal (102-1) to couple to the host computing device (410) or another modular computing component (100). In some examples, the modular computing component (100) includes a second terminal (102-2). In other words, each modular computing component (100) includes two terminals (102), one to connect to an upstream modular computing component (100) or the host computing device (410), and one to connect to a downstream modular computing component (100). In other words, the modular computing components (100) may be serially coupled to one another. In this example, a signal from a downstream modular computing component (100) is transmitted through an upstream modular computing component (100) to the host computing device (410).

In this example, the host computing device (410) may enforce certain build level, revision level, and/or generation level operations. That is, certain operations may not be permitted in a design build stage and so the host computing device (410) after receiving the build level, revision level, and/or generation level information, may block certain operations, or enable certain functionalities based on what build level, revision level, or generation level pertains to the different modular computing components (100).

As described above, each modular computing component (100) includes a controller (106) and controller memory (104). In some examples, each modular computing component (100) includes an alignment component (418). The alignment component (418) may be disposed on a top surface and/or a bottom surface of the housing (416) to receive, align, and retain the modular computing component (100) to other modular computing components (100) and/or the host computing device (410). That is, as described above, the computing system (408) is formed of stackable modules each having their own housing (416) with components enclosed therein. Accordingly, the alignment components (418) of a modular computing component (100) ensure that while stacked, such components remain in place and do not fall over, potentially damaging one another. Moreover, the alignment components (418) ensure a secure electrical connection via the terminals (102) of the modular computing components (100) and host computing device (410).

Figure 5:
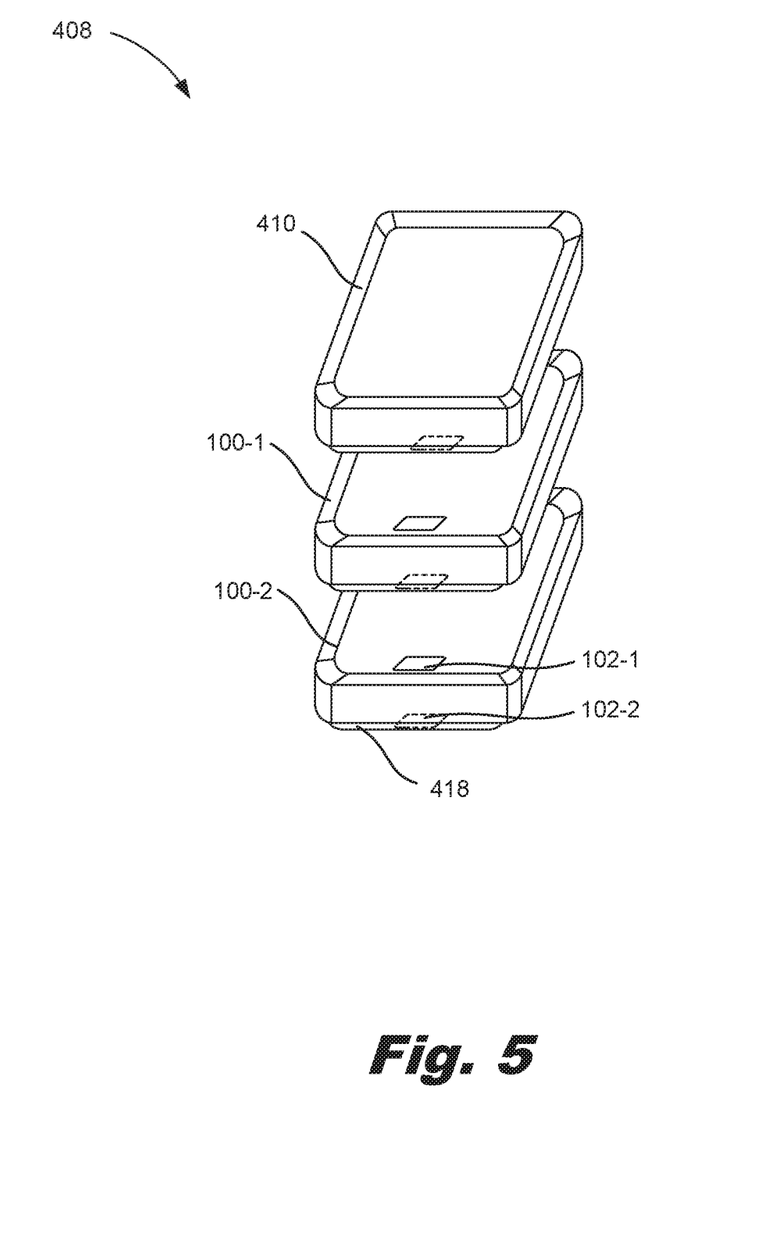
FIG. 5 is a diagram of a computing system with modular components, according to an example of the principles described herein.

FIG. 5 is a diagram of a computing system (408) with modular computing components (100-1, 100-2), according to an example of the principles described herein. As described above, the computing system (408) includes a host computing device (410) and various modular computing components (100-1, 100-2). The host computing device (410) along with the modular computing components (100-1, 100-2) are stackable. Accordingly, each of the host computing device (410) and the modular computing components (100-1, 100-2) include alignment components (418). In this example, the alignment component (418) includes a depression on the top of each modular computing component (100) that aligns with a protrusion on a bottom of an adjacently stacked modular computing component (100). The alignment component (418) ensures that the modular computing components (100) remain stacked and also ensures that the electrical connection is secured.

FIG. 5 also depicts the first terminals (102-1) and the second terminals (102-2) on each modular component (100). For simplicity, a single instance of each of a first terminal (102-1) and a second terminal (102-2) are indicated with a reference number. Accordingly, the computing system (408) as described herein is modular in that additional modular computing components (100) can be added as desired to create a computing system (408) with customized functionality.

In summary, using such a computing system 1) provides development information to component developers; 2) streamlines debugging and other development operations; 3) avoids user intervention and error in acquiring the development information: and 4) automates development information transmission. However, the devices disclosed herein may address other matters and deficiencies in a number of technical areas.

What is claimed is:

1. A modular computing component, comprising:
   a first terminal to connect the modular computing component to at least one of a host computing device and another modular computing device;
   controller memory to store information relating to at least one of build level information, revision level information, and generation level information; and
   a controller to:
   set to an alternative mode wherein signals indicating the build level information, revision level information, and generation level information are passed using a communication protocol specific to this information; and
   when in the alternative mode, transmit the at least one of build level information, revision level information, and generation level information to the host computing device, wherein other communication protocols are used when the controller is in a different predetermined mode.

2. The component of claim 1, wherein the controller transmits each of:
   the build level information which indicates a production stage of the modular computing component;
   the revision level information which indicates a version number of the modular computing component; and
   the generation level information which indicates a generation number of the host computing device.

3. The component of claim 1, further comprising a second terminal to serially couple the modular computing component to another modular computing component.

4. The component of claim 3, wherein build level information, revision level information, and generation level information are transmitted through the modular computing component from a downstream modular computing component.

5. The component of claim 1, further comprising an alignment component disposed on at least one of a top surface and a bottom surface of a housing to receive and align the modular computing component with at least one of the host computing device and another modular computing component.

6. The component of claim 1, wherein:
   the controller manages at least one of build level operations, revision level operations, and generation level operations.

7. The component of claim 1, wherein at least one of the build level information, revision level information, and generation level information is a re-writeable value.

8. A method comprising:
   querying a modular computing component for build level information, revision level information, and generation level information;
   setting a controller to an alternative mode wherein signals indicating the build level information, revision level information, and generation level information are passed using a communication protocol specific to this information;
   receiving, when in the alternative mode and responsive to the querying, the build level information, revision level information, and generation level information for the modular computing component;
   generating a message indicating the build level information, revision level information, and the generation level information; and
   taking an action, at a computing device, based on the build level information, revision level information, and generation level information for the modular computing component.

9. The method of claim 8, wherein, information received from the modular computing component are received as digital values that map to build level information, revision level information, and generation level information.

10. The method of claim 8, further comprising determining, based on the build level information, revision level information, and generation level information whether the modular computing component is outdated.

11. The method of claim 8, further comprising entering an alternative mode wherein the build level information, revision level information, and generation level information is transmitted via a multi-use configuration channel communication link.

12. The method of claim 8, wherein the action comprises at least one of:
provide the information to a user via a message;
updating the modular computing component;
disabling a subset of the functionalities of the modular computing component; and
deactivating the modular computing component.

13. A computing system comprising:
a host computing device comprising:
  a processor;
  memory communicatively coupled to the processor, the memory having instructions embodied therewith, the instructions executable by the processor to cause the processor to carry out a computing operation; and
at least one modular computing component, comprising:
  a housing;
  a first terminal to connect the modular computing component to at least one of the host computing device and another modular computing component;
  a second terminal to serially couple the modular computing component to another modular computing component;
  controller memory to store information relating to at least one of build level information, revision level information, and generation level information wherein:
    build level information indicates a production stage of the modular computing component;
    revision level information indicates a division within the build level for the modular computing component; and
    generation level information indicates a feature set for a modular computing component;
  a controller to:
    be set to an alternative mode wherein signals indicating the build level information, revision level information, and generation level information are passed using a communication protocol specific to this information; and
    when in the alternative mode, transmit the at least one of build level information, revision level information, and generation level information to the host computing device, wherein other communication protocols are used when the controller is in a different predetermined mode
  and an alignment component disposed on at least one of a top surface and a bottom surface of the housing to receive and align the modular computing component with at least one of the host computing device and another modular computing component;
  wherein the modular computing component is external to the host computing device.

14. The computing system of claim 13, wherein the host computing device has a same form factor as the at least one modular computing component.

15. The computing system of claim 13, wherein:
the at least one modular computing components comprises multiple modular computing components; and
the host computing device and multiple modular computing components are stacked on one another during operation.

16. The component of claim 1, wherein the generation level information indicates a feature set of the modular computing component.

17. The component of claim 1, wherein the generation level information indicates a compatibility with other modular computing components.

18. The method of claim 8, wherein the revision level information defines a modular computing component stage within a particular build level.

19. The method of claim 8, further comprising providing a development history for the modular computing component based on the build level information, revision level information, and generation level information for the modular computing component.

20. The method of claim 8, further comprising enforcing particular operations based on the build level information, revision level information, and generation level information for the modular computing component.

* * * * *